March 4, 1952 H. GARNSEY ET AL 2,587,721
VINEYARD CULTIVATOR
Filed May 24, 1947 2 SHEETS—SHEET 1
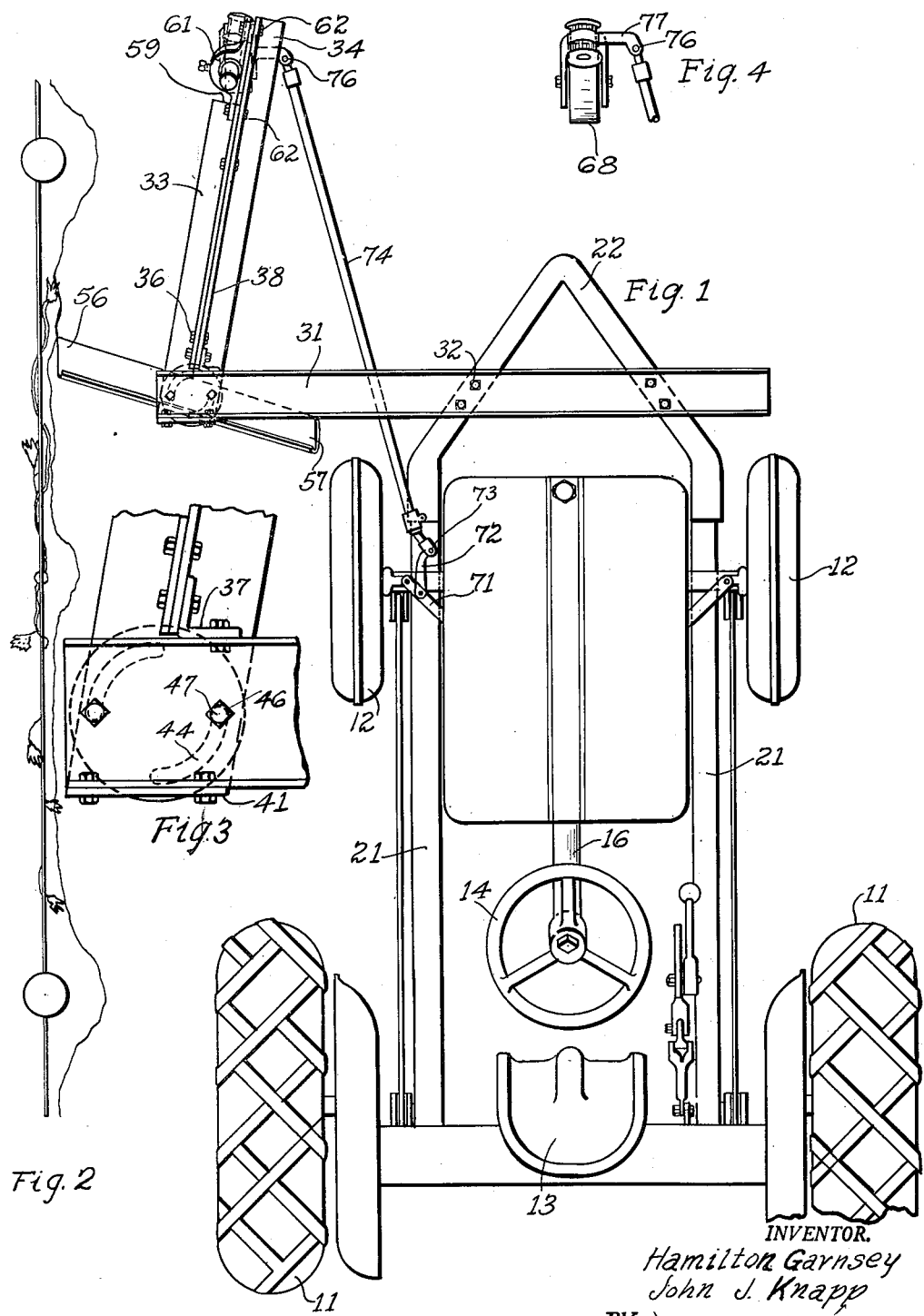
INVENTOR.
Hamilton Garnsey
John J. Knapp
BY
their Attorney March 4, 1952     H. GARNSEY ET AL     2,587,721
VINEYARD CULTIVATOR
Filed May 24, 1947                                            2 SHEETS—SHEET 2
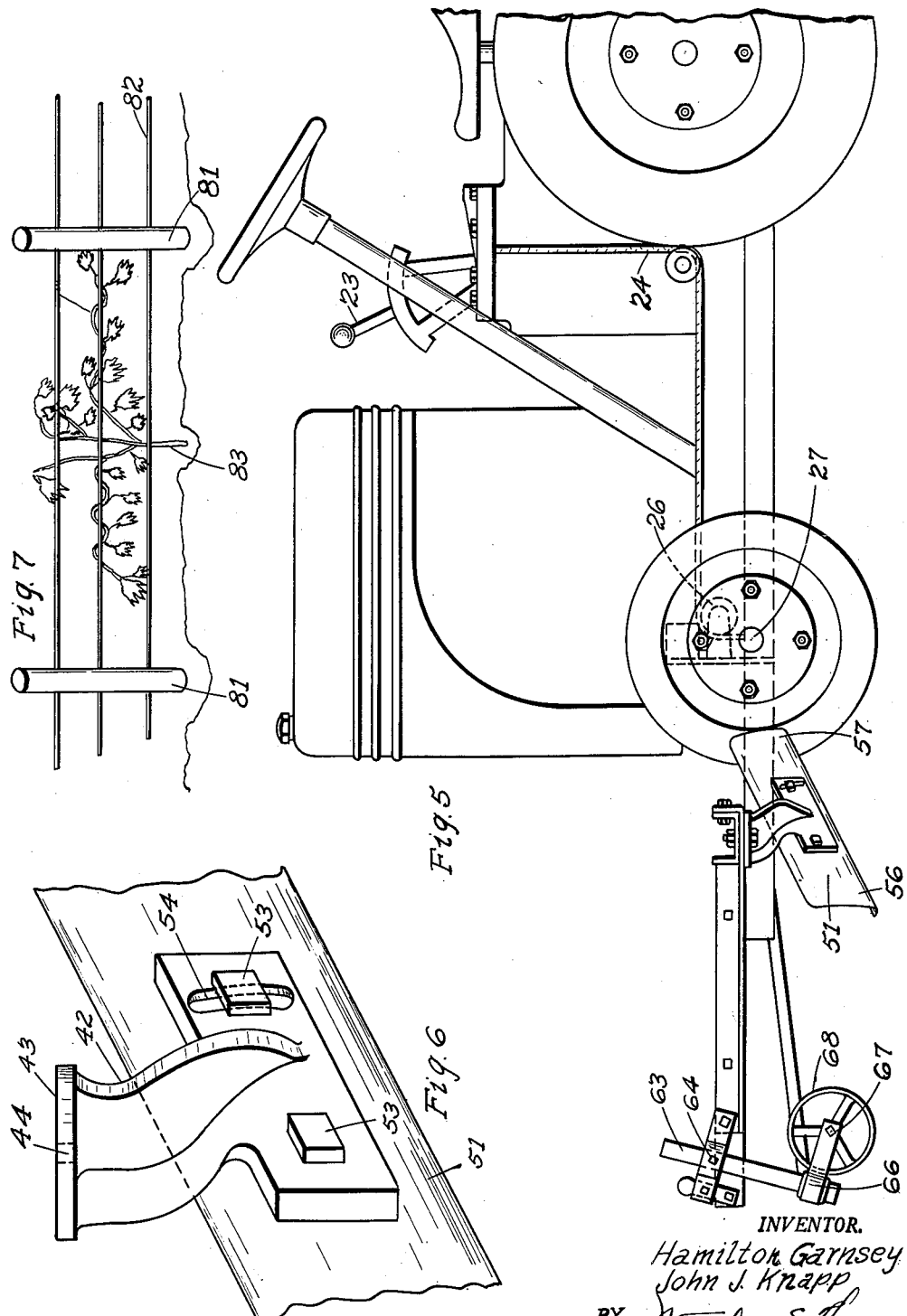
INVENTOR.
Hamilton Garnsey
John J. Knapp
BY *their Attorney*

Patented Mar. 4, 1952

2,587,721

UNITED STATES PATENT OFFICE 2,587,721

VINEYARD CULTIVATOR

Hamilton Garnsey and John J. Knapp,
Seneca Falls, N. Y.

Application May 24, 1947, Serial No. 750,232

3 Claims. (Cl. 97—137)

Our invention relates to cultivators and more particularly to a cultivator suitable for use in the cultivation of the soil in the row between the adjacent vines in a vineyard or the cultivation and care of other trees, bushes, shrubs and plants which grow in rows.

In the care of grape vineyards, it is considered necessary generally several times a year to cultivate the soil between the individual vines in the row for the purpose of not only keeping down weeds, but also to loosen the soil and retain moisture and otherwise stimulating plant growth. In the case of vineyards, the cultivation in the row between the vines is complicated by the fact that posts are provided which support the wires to which the grapevines are tied. It is thus necessary for the farmer to weave in and out between the posts and vines as he stirs up and loosens the soil and cuts down the weeds.

In the past this work has been generally done by a man walking and laboriously guiding a hoe in and out between the posts and vines as the hoe is drawn forwardly by a horse or tractor. If the work is done by tractor, the method now generally used, a second man is required for operating the tractor. Regardless of whether a horse or tractor is employed, the progress can be no faster than that of the man operating the hoe and walking along very slowly as he weaves the hoe in and out between the vines and posts. Moreover, it is necessary for the man operating the hoe to apply an appreciable pressure on the hoe to cut down weeds and break up the soil.

While some devices have been made for attachment to a tractor whereby the hoe can be operated by means of levers so as to push the cutting blade into and out of the spaces between the vines and posts, these devices are intricate and laborious to operate, and slow. Actually they are a little better than the hand method of operating the hoe and hence have not been extensively commercially applied.

An object of our invention is to provide a cultivator for vineyards or the like which may be conveniently and readily attached to a tractor, is inexpensive to manufacture and efficient in operation.

Another object of our invention is to provide a cultivator, particularly suited for use in cultivating in the row in a vineyard, which may be conveniently attached to a tractor and may be operated by the same man who drives the tractor.

Our invention further contemplates a cultivator for vineyards or the like in which a blade is mounted on the usual utility frame employed on tractors in such position that the blade lies to the side of the tractor and forwardly thereof, the cultivator assembly further being adapted for use in all operations in connection with vineyard cultivation and cutting down weeds, the arrangement being such that the driver of the tractor has the soil handling blade in view at all times and by properly steering the tractor may weave the blade into and out of the line of vines and posts efficiently and rapidly so as to cut down weeds and loosen up the soil in the row of vines.

Other objects and advantages of our invention will be particularly set forth in the claims and will be clear from the following description, when taken in connection with the accompanying drawings, in which:

Fig. 1 is a top plan view showing the major elements of a conventional tractor, the conventional utility frame frequently employed in connection with tractors and the cultivating attachment of our invention applied thereto;

Fig. 2 is a top plan view showing a line of posts and grapevines, Fig. 2 having been placed in such relationship to Fig. 1 as to illustrate the operation of the cultivator of our invention;

Fig. 3 is a top plan view on an enlarged scale of a portion of Fig. 1;

Fig. 4 is an enlarged top plan view of another portion of Fig. 1 with the supporting frame removed;

Fig. 5 is a side elevation of the tractor shown in Fig. 1 looking at the side of the tractor upon which the cultivator of our invention is mounted;

Fig. 6 is an enlarged rear view of the soil handling blade showing how the angle thereof may be adjusted; and Fig. 7 is an elevational view of Fig. 2 showing how the vines are grown on wires supported from posts.

While the cultivator of our invention has been shown and will be described in connection with its use in vineyards for which purpose it is particularly adapted, it will be understood that the cultivator has other applications for its use, for example, in connection with the cultivation of trees, bushes, shrubs or other plants which are grown in rows with at least some space between the adjacent plant growths in the rows.

The cultivator of our invention is applied to a conventional tractor having a chassis, rear wheels 11, front wheels 12, a driver's seat 13, a steering wheel 14, and a steering column 16. It is unnecessary to describe the tractor in detail since their construction is well known and any suitable type of tractor may be employed.

The tractor is provided with the usual auxiliary or utility frame 21 which extends along the side of the tractor and forwardly thereof, as shown at 22. Mounted adjacent the steering wheel and in convenient position to be operated by the driver is a lever 23 which serves, by well known means, to actuate a cable 24 which passes over a roller 26 and is attached at 27 to the utility frame. By operating the lever 23, the utility frame may be raised and lowered. All the foregoing parts are well known in the art to which the invention applies and need not be more particularly described.

Carried by the utility frame 21 is a support 31 which extends preferably approximately at right angles to the longitudinal center of the tractor. The support 31 preferably extends to the side well beyond the front wheels of the tractor, as shown, and may be conveniently made of channel iron bolted to the utility frame, as shown at 32.

Extending forwardly from the support 31 is an arm 33. Preferably the arm extends well forwardly of the support 31 at an angle to the support 31 such that the forward end 34 is spaced inward from the rearward end at its point of attachment to the support 31. The arm 33 may be made up in any suitable manner as by a pair of angle irons bolted together, as indicated at 36. The arm 33 may be attached to the support 31 in any suitable manner as by welding or if desired it may be bolted thereto through an angle piece 37, as shown in Fig. 3. The flanges 38 of the arm 33 are preferably cut off beyond the support 31 so as to provide a flat surface underlying the channel forming the support 31. The rearward end of the arm 33 may be turned upwardly, as indicated at 41, and bolted to the side flange of the channel 31.

Attached to the underside of the arm 33 is a blade support 42, the construction of which is most clearly shown in Fig. 6. The blade support comprises a casting which has a flat top surface 43 and is provided with arcuate slots 44. The metal forming the portion of the arm 33 overlying the surfaces 43 and the channel 31 are provided with bolt openings, as shown at 46, to receive bolts 47 which extend through the slots 44 and through the bolt openings 46.

The soil handling blade 51 is bolted to the casting 42, as shown at 53. Preferably, the casting is slotted at 54 for the reception of one of the bolts 53 so that the angular position of the blade may be varied. That is, referring to Fig. 5, it is sometimes desirable that the outer edge 56 of the blade be lower than the inner edge 57 of the blade. The arrangement shown permits either this positioning of the edges 56 and 57, or permits the inner and outer edges 56 and 57 to be at the same level.

As shown most clearly in Fig. 1, the forward part of one side of the arm 33 is cut away, as shown at 59, to accommodate a bracket 61 rigidly bolted to the arm, as shown at 62. The bracket 61 has a bore for the reception of a rod 63 which extends through the bore and is adapted to be positioned therein, in accordance with the adjustment desired, by a set screw 64 (Fig. 5).

The lower end of the rod 63 carries a fork 66 rigidly secured thereto which has openings for the reception of a shaft, as indicated at 67. The shaft carries a guide wheel 68 which is freely rotatable on the shaft as the tractor is moved forward.

It will now be appreciated that the frame 21, together with the support 31, the arm 33, and the soil handling blade are lowered by means of the lever 23 until the wheel 68 rides on the ground. The position of the rod 63 in the bracket 61 determines the position of the arm 33 and the support 31 with reference to the ground level and hence the depth of cut made by the soil handling blade 51. When desired to vary the depth of cut, the rod 63 may be adjusted in the bracket 61 and the set screw 64 repositioned to thereby position the soil handling blade 51 and adjust the depth of cut which, in general, should be as deep as possible without interfering with or damaging the roots of the vines.

The steering mechanism of the tractor is of a conventional well known type and includes linkage 71 which connects the steering column to the front wheels 12. To the linkage 71 a link 72 is rigidly secured, the link being pivoted at 73 to a steering rod 74. The steering rod 74 is pivoted at 76 (Fig. 4) to an arm 77 connected to the fork 66.

Through the connections above described, rotation of the steering wheel 14 to rotate the front wheels 12 and steer the tractor causes a similar steering action on the guide wheel 68. Because any steering movement of the wheels 12 is reflected in a corresponding steering movement of the wheel 68, the stresses and strains are to a large extent removed from the cultivator of our invention and greater accuracy in manipulating the soil handling blade may be secured.

In Fig. 7 we have shown a typical vineyard row having posts 81, support wires 82 and a grapevine 83. In the drawings we have only shown a single vine as supported between adjacent posts. It will, however, be understood that the posts are usually placed 24 to 27 feet apart and that most frequently three vines are placed between each pair of adjacent posts. The vines are usually trimmed pretty well toward the ground level and are tied to the wires in the conventional manner.

Referring now to Fig. 2 and viewing this figure in connection with Fig. 1, it will be appreciated that the operator of the tractor has the soil handling blade in full view at all times. He is able to see the posts and the vines and steer the tractor so as to shift the soil handling blade into and out of the row, as necessitated by obstructing posts and vines. With a little practice he is able to develop considerable accuracy so as to cut weeds extremely close to the posts and vines and pull the soil outward from the row as the tractor moves relatively rapidly down the row of vines. After the completion of the cutting of the weeds and the pulling of the soil out of the row of one or more rows, upon loosening the bolts 47, the casting 42 may be rotated to adjust the soil handling blade. The blade is preferably turned through thirty or forty degrees, so that the leading edge 56, as viewed in Fig. 1, becomes the following edge. The operator then can return with his tractor over the row which he has cultivated and throw the loose earth back into the row and around the vines.

While we have shown and described the preferred forms of our invention, it will be apparent that various changes and modifications may be made therein, particularly in the form and relation of parts, without departing from the spirit of our invention as set forth in the appended claims.

We claim:

1. An apparatus for attachment to a motor vehicle for the cultivation of grapes or other produce in which the vines are supported by or from posts or poles in alignment with each other, the motor vehicle being provided with a frame which is movable upwardly and downwardly with respect to the ground level by the operator, comprising, in combination, a support carried by said frame and extending to the side of the vehicle well beyond the front wheels, a soil handling blade carried by said support, said blade lying substantially wholly outside the front wheels and extending at an angle to the direction of movement of the vehicle, means for adjusting the angle of said blade to enable the blade to be positioned so as to throw the soil either toward or away from the vines, a wheel carried by said frame forwardly of the blade and inwardly of the outer edge thereof and means interconnecting the steering mechanism of the vehicle with said wheel whereby said wheel turns with the front wheels of the vehicle.

2. An apparatus for attachment to the forward end of a motor vehicle having a steering mechanism and being for the purpose of cultivation of grapes or other produce in which the vines are supported by or from posts or poles in alignment with each other, the motor vehicle being provided with a frame extending forwardly of the vehicle and which is movable upward and downward with respect to the ground level under the constant control of the operator comprising, in combination, a support carried by the frame wholly forward of the front wheels, movable upward and downward with the frame and extending to the side of the vehicle a substantial distance beyond the front wheels, a soil handling blade carried by said support substantially wholly outside the front wheels with its soil handling surface being at an angle other than a right angle to the direction of movement of the vehicle and the whole of said blade being at the same angle to the direction of movement, a wheel carried by said support a substantial distance forwardly of said blade and movable upward and downward therewith, and means interconnecting the steering mechanism of the vehicle with said wheel whereby said wheel turns with the front wheels of the vehicle.

3. An apparatus for attachment to the forward end of a motor vehicle having a steering mechanism and being for the purpose of cultivation of grapes or other produce in which the vines are supported by or from posts or poles in line with each other, the motor vehicle being provided with a frame extending forwardly of the vehicle and which is movable upward and downward with respect to the ground level under the constant control of the operator comprising, in combination, a support carried by the frame wholly forward of the front wheels and movable upward and downward with the frame, said support extending approximately at right angles to the longitudinal center line of the motor vehicle and said support having a free end located a substantial distance to the side of and beyond the front wheels, a soil handling blade attached to said support adjacent said free end with its soil handling surface being at an angle other than a right angle to the direction of movement of the vehicle and the whole of said blade being at the same angle to the direction of movement, an arm secured to and extending forwardly from said support, a wheel carried by said arm a substantial distance forwardly of said soil handling blade and movable upward and downward therewith, and means interconnecting the steering mechanism of the vehicle with said wheel whereby said wheel turns with the front wheels of the vehicle.

HAMILTON GARNSEY.
JOHN J. KNAPP.

REFERENCES CITED

The following references are of record in the file of this patent:

UNITED STATES PATENTS

| Number | Name | Date |
| --- | --- | --- |
| 655,375 | Scanlon | Aug. 7, 1900 |
| 888,635 | Morris | May 26, 1908 |
| 1,078,514 | Parkhurst | Nov. 11, 1913 |
| 1,361,638 | Stephenson | Dec. 7, 1920 |
| 1,873,749 | Flanagan | Aug. 23, 1932 |
| 2,419,331 | Best | Apr. 22, 1947 |
| 2,433,422 | Briscoe | Dec. 30, 1947 |
| 2,442,198 | Dawley | May 25, 1948 |